United States Patent
Nguyen et al.

(10) Patent No.: US 10,455,139 B2
(45) Date of Patent: Oct. 22, 2019

(54) IMAGE PROCESSING DEVICE AND IMAGE PROCESSING METHOD FOR CALCULATING DISTANCE INFORMATION TO A SUBJECT

(71) Applicant: Panasonic Corporation, Osaka (JP)

(72) Inventors: Khang Nguyen, Osaka (JP); Takashi Kawamura, Osaka (JP); Shinsaku Hiura, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 15/667,513

(22) Filed: Aug. 2, 2017

(65) Prior Publication Data
US 2017/0332007 A1 Nov. 16, 2017

Related U.S. Application Data

(63) Continuation of application No. PCT/JP2016/002973, filed on Jun. 21, 2016.

(30) Foreign Application Priority Data

Feb. 29, 2016 (JP) ................... 2016-038438

(51) Int. Cl.
*H04N 5/232* (2006.01)
*G06T 7/571* (2017.01)
(Continued)

(52) U.S. Cl.
CPC .......... *H04N 5/23212* (2013.01); *G01C 3/08* (2013.01); *G01C 3/32* (2013.01); *G02B 7/365* (2013.01);
(Continued)

(58) Field of Classification Search
CPC .......... H04N 5/23212; H04N 5/23219; H04N 5/2356; G02B 7/28; G02B 7/36;
(Continued)

(56) References Cited

U.S. PATENT DOCUMENTS 8,983,221 B2* 3/2015 Fujii .................... H04N 1/4092
382/254
2011/0267477 A1* 11/2011 Kane ....................... G02B 7/36
348/207.1

(Continued)

FOREIGN PATENT DOCUMENTS

JP 11-337313 12/1999

OTHER PUBLICATIONS

Morgan-Mar David et al., "Depth from defocus using the mean spectral ratio", Visual Communications and image Processing, 2004 (Year: 2004).*

(Continued)

*Primary Examiner* — Nelson D. Hernández Hernández
(74) *Attorney, Agent, or Firm* — Wenderoth, Lind & Ponack, L.L.P.

(57) ABSTRACT

Image processing device is image processing device that uses a plurality of images respectively having focusing positions different from each other to calculate distance information to a subject, and includes frequency converter, amplitude extractor, and distance information calculator. Frequency converter converts the plurality of images into frequency. Amplitude extractor extracts an amplitude component out of a phase component and the amplitude component of a coefficient obtained by converting the plurality of images into frequency. Distance information calculator calculates the distance information, by using lens blur data (Continued)

and only the amplitude component extracted by amplitude extractor out of the phase component and the amplitude component of the coefficient.

6 Claims, 3 Drawing Sheets

(51) Int. Cl.
*G02B 7/38* (2006.01)
*G02B 7/36* (2006.01)
*H04N 19/62* (2014.01)
*G01C 3/08* (2006.01)
*G01C 3/32* (2006.01)
*H04N 1/32* (2006.01)

(52) U.S. Cl.
CPC ............... *G02B 7/38* (2013.01); *G06T 7/571* (2017.01); *H04N 5/23229* (2013.01); *H04N 19/62* (2014.11); *H04N 1/3216* (2013.01)

(58) Field of Classification Search
CPC .......... G02B 7/30; G02B 7/305; G02B 7/343; G02B 7/09; G02B 7/04; G02B 7/287; G02B 7/285; G02B 7/346; G03B 13/32; G03B 3/00; G03B 3/10; G03B 3/36; G03B 3/02; G03B 3/04; G03B 3/06; G03B 3/12; G03B 3/34
See application file for complete search history.

(56) References Cited

U.S. PATENT DOCUMENTS

| 2013/0010077 A1* | 1/2013 | Nguyen | G06T 1/0007 348/46 |
| 2013/0063566 A1* | 3/2013 | Morgan-Mar | G06T 7/571 348/46 |
| 2015/0276398 A1* | 10/2015 | Ikemoto | G01C 3/085 348/135 |

OTHER PUBLICATIONS

International Search Report of PCT application No. PCT/JP2016/002973 dated Sep. 13, 2016.
The Extended European Search Report dated Jan. 25, 2019 for the related European Patent Application No. 16880193.4.
Morgan-Mar David et al: "Depth from defocus using the mean spectral ratio", Visual Communications and Image Processing; Jan. 20, 2004-Jan. 20, 2004; San Jose, vol. 9023, Mar. 7, 2014 (Mar. 7, 2014), pp. 90230H-90230H, XP060035818.

* cited by examiner

IMAGE PROCESSING DEVICE AND IMAGE PROCESSING METHOD FOR CALCULATING DISTANCE INFORMATION TO A SUBJECT

TECHNICAL FIELD

The present disclosure relates to an image processing device and an image processing method that use a plurality of images respectively having focusing positions different from each other to calculate distance information to a subject.

BACKGROUND ART

In an image capturing device or the like, various techniques have been devised for calculating without contact a depth of a certain three-dimensional scene, that is, distance information to a subject from the image capturing device or the like. When those are roughly categorized, there are an active technique and a passive technique. In the active technique, infrared light, ultrasound, or laser is emitted to the subject, and based on a time until a reflected wave returns or an angle of the reflected wave, the distance information to the subject is calculated. In the passive technique, the distance information to the subject is calculated based on an image of the subject. Especially in a camera, the passive technique is widely used that does not require a device for emitting the infrared light or the like.

Many techniques have been devised also in the passive technique. As one of them, there is a technique called Depth from Defocus (hereinafter referred to as DFD) in which the distance information to the subject is calculated based on information of a blur, the blur changing in size and shape depending on a distance to the subject. The DFD has features such that a plurality of cameras is not required, and it is possible to calculate the distance information to the subject by using a small number of images.

Hereinafter, the principle of the DFD will be briefly described.

The DFD is a technique for calculating the distance information to the subject, based on the information of the blur, from a plurality of images respectively having focusing positions different from each other. A captured image including the information of the blur (hereinafter, referred to as a blur image) is an image in which a point spread function being a function of the distance to the subject is convoluted with an all-in-focus image representing a state without a blur due to a lens. Since the point spread function (hereinafter, referred to as the PSF) is the function of the distance to the subject, the distance information to the subject can be calculated by detecting the information of the blur from the blur image, with the DFD). However, at this time, the all-in-focus image and the distance information to the subject are unknown. Since one formula relating to the blur image, the all-in-focus image, and the distance information to the subject is established for one blur image, blur images having different focusing positions from each other are newly captured and new formulas are obtained. The obtained multiple formulas are solved, and the distance information to the subject is calculated. Regarding a method for obtaining the formula and a method for solving the formula, various methods have been devised for the DFD, including the one in PTL 1.

CITATION LIST

Patent Literature

PTL 1: JP H11-337313 A

SUMMARY

However, when the plurality of images respectively having focusing positions different from each other is tried to be obtained, the plurality of images is obtained by changing focus of a lens system, so that a time difference occurs between times to obtain the respective images. When a position, a shape, or the like of the subject greatly change within the time difference, positional deviation occurs in the subject between the plurality of images, so that it may be difficult to accurately calculate the distance information to the subject. That is, it may be difficult to use conventional DFD in capturing a still image or a moving image of a fast-moving subject.

The present disclosure provides an image processing device and an image processing method capable of accurately calculating the distance information to the subject in capturing the still image or the moving image of the fast-moving subject.

The image processing device in the present disclosure is an image processing device that uses a plurality of images respectively having focusing positions different from each other to calculate distance information to a subject, and includes a frequency converter, an amplitude extractor, and a distance information calculator. The frequency converter converts the plurality of images into frequency. The amplitude extractor extracts an amplitude component out of a phase component and the amplitude component of a coefficient obtained by converting the plurality of images into frequency. The distance information calculator calculates the distance information, by using lens blur data and only the amplitude component extracted by the amplitude extractor out of the phase component and the amplitude component of the coefficient.

In addition, the image processing method in the present disclosure is an image processing method that uses a plurality of images respectively having focusing positions different from each other to calculate distance information to a subject, and includes converting the plurality of images into frequency, extracting an amplitude component out of a phase component and the amplitude component of a coefficient obtained by converting the plurality of images into frequency, and calculating the distance information by using lens blur data and only the amplitude component extracted out of the phase component and the amplitude component of the coefficient.

The image processing device and the image processing method in the present disclosure are capable of accurately calculating the distance information to the subject in capturing the still image or the moving image of the fast-moving subject.

DESCRIPTION OF EMBODIMENTS

Hereinafter, exemplary embodiments will be described in detail with reference to the drawings as appropriate. However, more detailed description than necessary may be omitted. For example, a detailed description of already well-known matters and redundant description on substantially the same configuration nay be omitted.

This is for avoiding unnecessary redundancy of the following description, and facilitating understanding by those skilled in the art.

Incidentally, the accompanying drawings and the following descriptions are provided to enable those skilled in the art to fully understand the present disclosure, and are not intended to limit the claimed subject matter.

First Exemplary Embodiment

Hereinafter, a first exemplary embodiment will be described with reference to FIG. 1.

Figure 1:
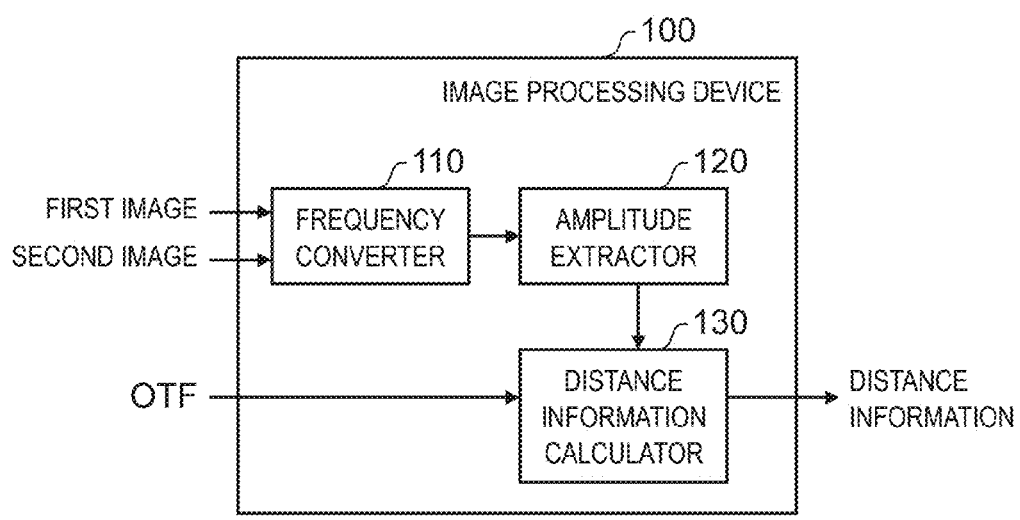
FIG. 1 is a block diagram illustrating a functional configuration of an image processing device in a first exemplary embodiment.

FIG. 1 is a block diagram illustrating a functional configuration of an image processing device in the first exemplary embodiment.

Image processing device 100 in the present exemplary embodiment is a device that uses a plurality of images respectively having focusing positions different from each other to calculate distance information to a subject. As illustrated in FIG. 1, image processing device 100 includes frequency converter 110, amplitude extractor 120, and distance information calculator 130.

Frequency converter 110 is a processor for converting the images into frequency. That is, frequency converter 110, for the plurality of images respectively having focusing positions different from each other, converts the images from an image space to a frequency space. The images are converted from the image space to the frequency space, whereby accuracy of distance information calculation can be improved. In the case of the present exemplary embodiment, frequency converter 110 converts the plurality of images from the image space to the frequency space. Here, description will be made assuming that, as the plurality of images, for example, a first image and a second image respectively having focusing positions different from each other are input to frequency converter 110. Incidentally, the plurality of images may be input in parallel or input serially. In addition, a method for converting the images from the image space to the frequency space by frequency converter 110 is not particularly limited, and for example, Fast Fourie Transform (FFT), Discrete Fourie Transform (DFT), and the like are used.

Amplitude extractor 120 is a processor for extracting an amplitude component out of a phase component and the amplitude component of a coefficient obtained by conversion into frequency by frequency converter 110. In the case of the present exemplary embodiment, amplitude extractor 120 extracts only amplitude components of coefficients of the first image and the second image obtained by conversion into the frequency space. Specifically, since the coefficient obtained by conversion into the frequency space is a complex number, amplitude extractor 120 extracts only the amplitude component by calculating an absolute value of the coefficient. Incidentally, the coefficient obtained by conversion into the frequency space is also referred to as a conversion coefficient. In the case of the present exemplary embodiment, amplitude extractor 120 extracts a first amplitude component and a second amplitude component that are amplitude components of the first image and the second image, respectively.

Distance information calculator 130 is a processor that uses lens blur data and only the amplitude component extracted by amplitude extractor 120 out of the phase component and the amplitude component of the coefficient, to calculate the distance information to the subject.

Here, the lens blur data is an optical transfer function determined by a configuration of an optical system such as a lens and an aperture of a camera acquiring the images. Hereinafter, the optical transfer function is referred to as the OTF.

Figure 2:
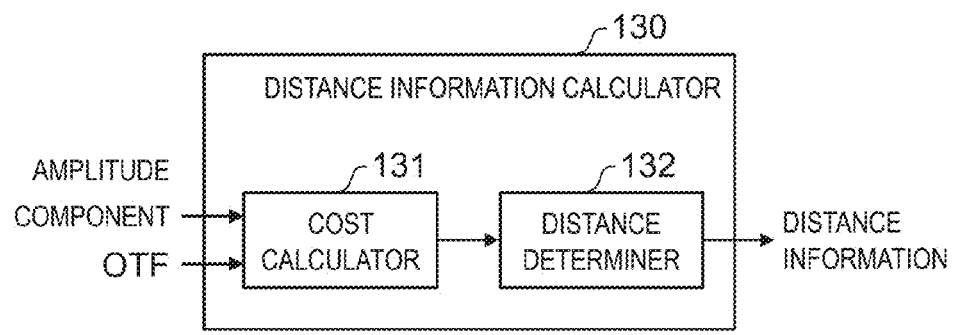
FIG. 2 is a block diagram illustrating a functional configuration of a distance information calculator in the first exemplary embodiment.

FIG. 2 is a block diagram illustrating a functional configuration of a distance information calculator in the present exemplary embodiment.

As illustrated in FIG. 2, distance information calculator 130 includes cost calculator 131 and distance determiner 132.

Cost calculator 131 is a processor that uses the lens blur data and the first amplitude component and the second amplitude component extracted by amplitude extractor 120, to calculate a cost of a distance assumed, for pixels of the images.

In the present exemplary embodiment, the DFD is used as a technique for calculating the distance information.

In addition, the OTF is used as the lens blur data. The DFD, to estimate which distance corresponds to each pixel in the images, calculates the cost of the distance (Cost(d)) for a plurality of distances d assumed, for example. A formula for calculating the cost of the distance is shown by Formula 1 below.

[Mathematical Formula 1]

$$\text{Cost}(d) = \text{abs}\left\{ ifft\left( \frac{-\frac{|OTF_2(d)|^2}{|OTF_1(d)|^2} + \frac{OTF_2(d)}{OTF_1(d)} \cdot \frac{|F_2|}{|F_1|}}{1 + \frac{|OTF_2(d)|^2}{|OTF_1(d)|^2}} |F_1| \right) \right\}^2 \quad \text{(Formula 1)}$$

$$+ \text{abs}\left\{ ifft\left( \frac{\frac{OTF_2(d)}{OTF_1(d)} \cdot \frac{|F_1|}{|F_2|} - 1}{1 + \frac{|OTF_2(d)|^2}{|OTF_1(d)|^2}} |F_2| \right) \right\}^2$$

Amplitude component of first image: $|F_1|$
Amplitude component of second image: $|F_2|$ Incidentally, Formula 1 is calculated based on Formula 2 below is a depth calculation formula considering image deviation. Here, the present disclosure can delete the phase component from the formula by applying the image deviation to one of the first image and the second image. That is, a solution can be obtained with only the amplitude component. It is new knowledge to apply the image deviation itself and to introduce the image deviation into the depth calculation formula. Conventionally, the image deviation is not applied, so that the image deviation is not introduced into the depth calculation formula, and as a result, the phase component remains in the formula even when Fourier transform is performed, and the depth cannot be accurately calculated when there is the image deviation.

[Mathematical Formula 2]

Depth calculation formula $\hat{d} =$ (Formula 2)
$$\operatorname*{argmin}_{d}\left[|F_0(\hat{d})OTF_1(d) - F_1|^2 + |F_0(\hat{d})OTF_2(d)OTF_{shift} - F_2|^2\right]$$

First image: $F_1 = F_0 \cdot OTF_1$

Second image: $F_2 = F_0 \cdot OTF_2 \cdot OTF_{shift}$

Image deviation: $OTF_{shift} = \dfrac{F_2}{F_1} \cdot \dfrac{|F_1|}{|F_2|}$

All-in-focus image of subject: $F_0(\hat{d}) =$
$$\dfrac{F_1\overline{OTF_1(d)} + F_2\overline{OTF_2(d)}OTF_{shift}}{|OTF_1(d)|^2 + |OTF_2(d)OTF_{shift}|^2}$$

Distance determiner 132 uses the cost of the distance calculated by cost calculator 131 to determine the distance information to the subject for each pixel. Here, among the plurality of distance d assumed for each pixel, the distance d in which the cost of the distance in each pixel becomes the smallest is output as the distance information of the pixel. That is, distance information calculator 130 calculates the distance information to the subject for each pixel of the images.

Figure 3:
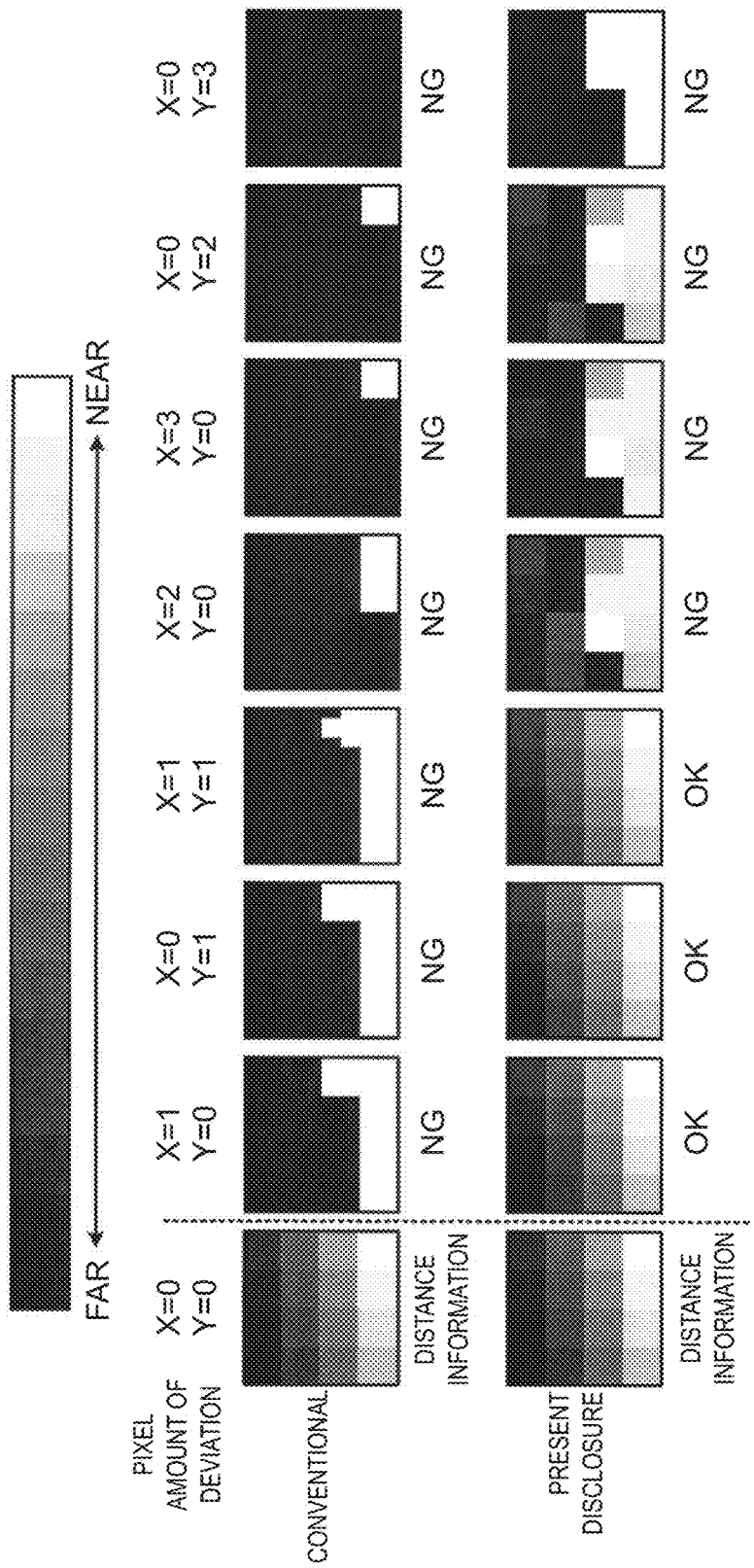
FIG. 3 is a diagram illustrating difference in accuracy for positional deviation between distance information calculated by a conventional technique and distance information calculated by a technique of the present disclosure.

FIG. 3 is a diagram illustrating difference in accuracy for positional deviation between distance information calculated by a conventional technique and distance information calculated by a technique of the present disclosure.

The first image in which a subject having different distances in 16 tones is captured and the second image in which the subject is deviated vertically (Y in FIG. 3) and horizontally (X in FIG. 3) (an amount of deviation is shown by a numeral in FIG. 3, the unit is a number of pixels) are used, and distance information calculated with the conventional technique and distance information calculated with the technique of the present disclosure are visually illustrated in FIG. 3. As illustrated in. FIG. 3, in the conventional technique, the distance information does not represent the distance to the subject when the image is deviated by only one pixel; however, in the technique of the present disclosure, the distance information accurately represents the distance to the subject even when the pixel is deviated by one pixel vertically and horizontally.

As illustrated in this result, it shows that the distance information to the subject cannot be accurately calculated unless alignment is accurately performed up to a sub-pixel level, in the conventional technique. On the other hand, in the technique of the present disclosure, it shows that the distance information to the subject can be accurately calculated even in rough alignment.

In addition, in the conventional technique, when the subject is moved by about one pixel during a period from acquisition of the first image to acquisition of the second image, the distance information to the subject cannot be accurately calculated. On the other hand, in the technique of the present disclosure, even when the subject is moved by about one pixel during a period from acquisition of the first image to acquisition of the second image, the distance information to the subject can be accurately calculated without position correction.

In this way, only the amplitude component is used and the distance information to the subject is calculated, whereby the distance information can be calculated fast while a calculation cost is suppressed. Further, in an image processing method of the present disclosure, even when there is positional deviation between the plurality of images respectively having focusing positions different from each other, the images are converted from the image space into the frequency space, and only the amplitude component not including position information is used and the distance information is calculated. For that reason, when the positional deviation is within a predetermined range, the distance information can be accurately calculated. Therefore, even in a case of capturing a still image or capturing a moving image of the subject moving at a high speed, the present disclosure can be applied.

Second Exemplary Embodiment

Hereinafter, a second exemplary embodiment will be described with reference to FIG. 4.

Figure 4:
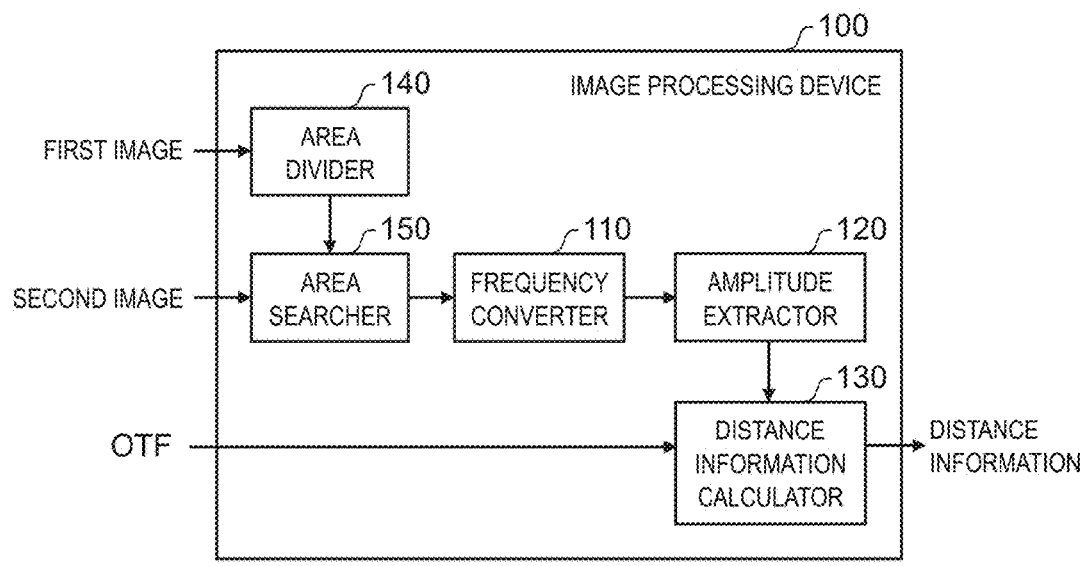
FIG. 4 is a block diagram illustrating a functional configuration of an image processing device in a second exemplary embodiment.

FIG. 4 is a block diagram illustrating a functional configuration of an image processing device in the second exemplary embodiment. Incidentally, in the present exemplary embodiment, the same reference numerals are used for the same configurations as those in the first exemplary embodiment, and descriptions of the configurations are omitted.

In the present exemplary embodiment, to further improve accuracy of distance information calculation, positional deviation between different images is corrected and then distance information is calculated.

Image processing device 100 in the present exemplary embodiment further includes area divider 140 and area searcher 150. Area divider 140 is a processor for dividing a first image into a plurality of first small areas. A size of each of the first small areas divided is not particularly limited, and for example, the first area may be divided into the first small areas of four pixels×four pixels.

Area searcher 150 is a processor that searches for a corresponding second small area for each of the plurality of first small areas divided, for another image other than the first image. That is, area searcher 150 corrects the positional deviation between images by searching for an image of the corresponding second small area in the second image for each of images of the first small areas of the first image and performing alignment.

Specifically, an image corresponding to each of the first small areas of the first image divided by area divider 140 is used, and the second image is searched for a corresponding image, and an area of a similar image is set to a second small area. For a search algorithm, although it is not particularly limited, in the present exemplary embodiment, block matching is used as the search algorithm. Incidentally, as the search algorithm, when it is possible to search for a corresponding area between images, another method may be used.

The block matching searches for the corresponding second small area in the second image, for each of the first small areas of the first image. In searching, a difference is calculated between each of the first small areas of the first image and each of the areas of the second image, and an area in which the difference is the smallest is set to the second small area. The difference is calculated based on a sum of brightness differences for the area, for example.

Frequency converter 110 in the present exemplary embodiment converts the image of each of the first small areas and the image of the corresponding second small area into frequency. Amplitude extractor 120 extracts an amplitude component for each of small areas that are each of the first small areas, and the corresponding second small area. That is, amplitude extractor 120 extracts the amplitude component for each of the first small areas and for each corresponding second small area. Distance information calculator 130 calculates distance information to a subject for each of the small areas. That is, distance information calculator 130 calculates the distance information to the subject for each of the first small areas each aligned with the corresponding second small area.

As described above, in the present exemplary embodiment, the first image of a plurality of images is divided into the first small areas, and alignment with another image is performed for each of the first small areas, whereby the positional deviation between the images can be finely corrected. For that reason, the distance information to the subject can be calculated more accurately. However, in the present disclosure, since the distance information can be accurately calculated even when some positional deviation occurs between the plurality of images, alignment between the images can be performed roughly.

For example, in normal DFD, the distance information can be accurately calculated only when alignment is performed up to a unit of 0.1 pixels for an area with a weak edge. On the other hand, in the present disclosure, the distance information can be accurately calculated even in alignment of about a unit of one pixel.

Third Exemplary Embodiment

Hereinafter, a third exemplary embodiment will be described with reference to FIG. 5.

Figure 5:
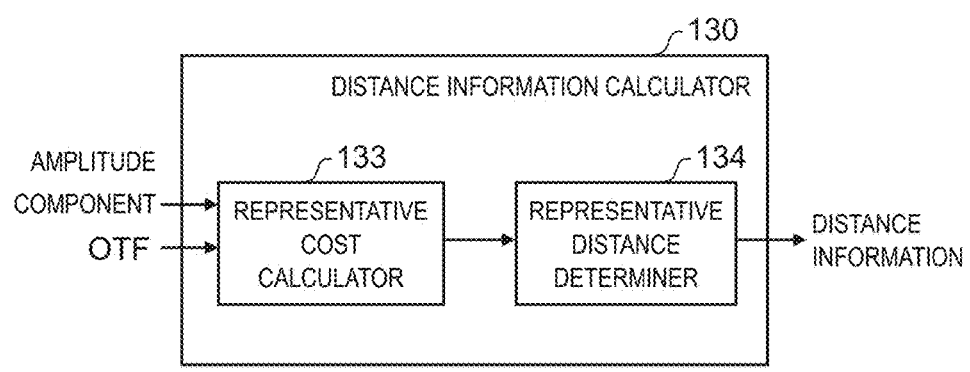
FIG. 5 is a block diagram illustrating a functional configuration of a distance information calculator in a third exemplary embodiment.

FIG. 5 is a block diagram illustrating a functional configuration of a distance information calculator in the present exemplary embodiment.

As illustrated in FIG. 5, distance information calculator 130 includes representative cost calculator 133 instead of cost calculator 131, and includes representative distance determiner 134 instead of distance determiner 132.

Representative cost calculator 133 uses an amplitude component of each of first small areas of a first image, an amplitude component of a second small area of a second image, and input lens blur data to calculate a representative cost of a distance assumed, for each of the small areas. That is, representative cost calculator 133 calculates the representative cost of the distance assumed, for each of the first small areas each aligned with the corresponding second small area. The representative cost of the distance is calculated with Formula 3 below.

[Mathematical Formula 3]

$$\text{Cost}(d) = \sum \left\{ \frac{|OTF_2(d) \cdot |F_1| - OTF_1(d) \cdot |F_2|\|^2}{|OTF_1(d)|^2 + |OTF_2(d)|^2} \right\} \quad \text{(Formula 3)}$$

Although a calculation technique for the representative cost of the distance is not particularly limited, in the present exemplary embodiment, one representative cost of the distance is calculated for one small area. Representative distance determiner 134 uses the representative cost of the distance calculated by representative cost calculator 133 to determine representative distance information for each of the small areas. Specifically, representative cost calculator 133 adds up frequency coefficient values, and representative distance determiner 134 calculates one piece of representative distance information for one small area as a representative value.

As described above, in the present exemplary embodiment, the representative distance information is calculated for each of the small areas, not for each pixel, whereby a calculation cost and memory used can be significantly reduced. For that reason, fast processing can be achieved, and a device cost can be reduced.

Specific effects of the present disclosure are, for example, as follows.

While a plurality of images respectively having focusing positions different from each other is captured, when positional deviation of a subject occurs between the plurality of images due to a camera shake or movement of the subject, distance information to the subject cannot be accurately obtained in some cases. In this case, alignment processing is required before calculating the distance information. However, in the alignment processing, due to a feature of the image, influence of noise, or the like, alignment cannot be accurately performed, or it takes a long time to accurately perform alignment, in some cases.

In the present disclosure, when a plurality of images captured at different timings is used and the distance information to the subject is calculated, the distance information to the subject can be accurately calculated even when alignment between the images is not performed or alignment is roughly performed.

As described above, as examples of the technique disclosed in the present disclosure, the first to third exemplary embodiments have been described. However, the technique in the present disclosure is not limited to these exemplary embodiments, and can also be applied to an exemplary embodiment to which modification, replacement, addition, omission, and the like are performed. In addition, a modification obtained by applying various modifications that can occur to those skilled in the art without departing from the gist of the present disclosure, that is, the meanings indicated by the words described in the claims to the above exemplary embodiments, is included in the present disclosure.

For example, when distance information in only a part of pixels is required for an image, the distance information in only the part of the pixels may be calculated. Specifically, for example, it is not necessary to perform searching to all first small areas, and may perform searching to each of the first small areas of interest to calculate the distance information.

In addition, the first small areas divided do not have to be completely independent of each other, and may partially lie on top of one another (overlap each other).

In addition, the shape of each of the first small areas is not limited to a square, and any shape can be selected.

In addition, in the first to third exemplary embodiments, the OTF is used as an input; however, in general, the PSF is converted to the OTF by Fourier transform, so that the PSF may be used as the input, and Fourier transform may be performed internally to convert the PSF to the OTF.

In addition, a program for causing a computer to execute image processing methods included in image processing device 100 and a recording medium in which the program is recorded are also within the scope of the present disclosure.

INDUSTRIAL APPLICABILITY

The present disclosure can be applied to an image processing device and an image processing method that use a plurality of images respectively having focusing positions different from each other to calculate distance information to a subject. Specifically, the present disclosure can be applied to a digital still camera, a digital movie camera, a mobile phone with a camera function, a smart phone, and the like.

REFERENCE MARKS IN THE DRAWINGS

- 100 image processing device
- 110 frequency converter
- 120 amplitude extractor
- 130 distance information calculator
- 131 cost calculator
- 132 distance determiner
- 133 representative cost calculator
- 134 representative distance determiner
- 140 area divider
- 150 area searcher

The invention claimed is:

1. An image processing device that uses a plurality of images respectively having focusing positions different from each other to calculate distance information to a subject, the image processing device comprising:
   a frequency converter that converts the plurality of images into frequency;
   an amplitude extractor that extracts an amplitude component out of a phase component and the amplitude component of a coefficient obtained by converting the plurality of images into frequency; and
   a distance information calculator that calculates the distance information, by using lens blur data and only the amplitude component extracted by the amplitude extractor out of the phase component and the amplitude component of the coefficient, and outputs the calculated distance information for controlling a lens system of a camera in capturing of images.,
   wherein the distance information calculator includes:
   a cost calculator that calculates a cost of a distance assumed for the plurality of images, based on a depth calculation formula, by using the lens blur data and the amplitude component extracted by the amplitude extractor, an image deviation being applied to one of the plurality of images and introduced into the depth calculation formula; and
   a distance determiner that determines the distance information, by using the cost of the distance calculated by the cost calculator.

2. The image processing device according to claim 1, further comprising:
   an area divider that divides one image of the plurality of images into a plurality of first small areas; and
   an area searcher that searches for a second small area corresponding to each of the plurality of first small areas, for another image of the plurality of images,
   wherein the frequency converter converts an image of each of the plurality of first small areas, and an image of the second small area corresponding to each of the plurality of first small areas into frequency,
   the amplitude extractor extracts the amplitude component, for each of the plurality of first small areas, and the second small area corresponding to each of the plurality of first small areas, and
   the distance information calculator calculates the distance information, for each of the plurality of first small areas.

3. The image processing device according to claim 2, wherein
   the cost calculator calculates a representative cost of a distance assumed for each of the plurality of first small areas, and
   the distance determiner determines representative distance information for each of the plurality of first small areas, by using the representative cost of the distance calculated by the cost calculator.

4. The image processing device according to claim 1, wherein
   the distance information calculator calculates the distance information for each pixel of the plurality of images.

5. An image processing method that uses a plurality of images respectively having focusing positions different from each other to calculate distance information to a subject, the image processing method comprising:
   converting the plurality of images into frequency;
   extracting an amplitude component out of a phase component and the amplitude component of a coefficient obtained by converting the plurality of images into frequency; and
   calculating the distance information, by using lens blur data and only the amplitude component extracted out of the phase component and the amplitude component of the coefficient,
   wherein the calculating of the distance information includes:
   calculating a cost of a distance assumed for the plurality of images, based on a depth calculation formula, by using the lens blur data and the amplitude component extracted, an image deviation being applied to one of the plurality of images and introduced into the depth calculation formula; and
   determining the distance information, by using the cost of the distance calculated.

6. An image processing device that uses a plurality of images respectively having focusing positions different from each other to calculate distance information to a subject, the image processing device comprising:
   a frequency converter that converts the plurality of images into frequency;
   an amplitude extractor that extracts an amplitude component out of a phase component and the amplitude component of a coefficient obtained by converting the plurality of images into frequency;
   a distance information calculator that calculates the distance information, by using lens blur data and only the amplitude component extracted by the amplitude extractor out of the phase component and the amplitude component of the coefficient, and outputs the calculated distance information for controlling a lens system of a camera in capturing of images;
   an area divider that divides one image of the plurality of images into a plurality of first small areas; and
   an area searcher that searches for a second small area corresponding to each of the plurality of first small areas, for another image of the plurality of images,
   wherein the frequency converter converts an image of each of the plurality of first small areas, and an image of the second small area corresponding to each of the plurality of first small areas into frequency, the amplitude extractor extracts the amplitude component, for each of the plurality of first small areas, and the second small area corresponding to each of the plurality of first small areas, and the distance information calculator calculates the distance information, for each of the plurality of first small areas, wherein the distance information calculator includes:

a cost calculator that calculates a cost of a distance assumed for the plurality of images, based on a depth calculation formula, by using the lens blur data and the amplitude component extracted by the amplitude extractor, an image deviation being applied to one of the plurality of images and introduced into the depth calculation formula; and a distance determiner that determines the distance information, by using the cost of the distance calculated by the cost calculator.

* * * * *